US011082104B2

(12) United States Patent
Cai et al.

(10) Patent No.: US 11,082,104 B2
(45) Date of Patent: Aug. 3, 2021

(54) APPARATUS FOR CONFIGURING REFERENCE SIGNAL BEAMS BASED ON ACCURACY OF USER EQUIPMENT LOCALIZATION

(71) Applicant: HUAWEI TECHNOLOGIES CO., LTD., Guangdong (CN)

(72) Inventors: Tao Cai, Kista (SE); Mario Costa, Helsinki (FI); Petteri Kela, Kista (SE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/576,528

(22) Filed: Sep. 19, 2019

(65) Prior Publication Data
US 2020/0014445 A1 Jan. 9, 2020

Related U.S. Application Data

(63) Continuation of application No. PCT/EP2017/056552, filed on Mar. 20, 2017.

(51) Int. Cl.
*H04B 7/06* (2006.01)
*G01S 5/02* (2010.01)
(Continued)

(52) U.S. Cl.
CPC .......... *H04B 7/0623* (2013.01); *G01S 5/0268* (2013.01); *G01S 5/0273* (2013.01);
(Continued)

(58) Field of Classification Search
CPC .... H04B 7/0623; H04B 7/0617; H04B 7/066; G01S 5/0268; G01S 5/0273; G01S 5/0036; G01S 3/74; G01S 5/0263; H04W 64/006
See application file for complete search history.

(56) References Cited

U.S. PATENT DOCUMENTS

| 5,448,751 A | * | 9/1995 | Takenaka | ............... | H04W 16/02 |
| | | | | | 455/450 |
| 2010/0113002 A1 | * | 5/2010 | Joko | ...................... | H04B 7/022 |
| | | | | | 455/422.1 |

(Continued)

FOREIGN PATENT DOCUMENTS

| CN | 101995574 A | 3/2011 |
| CN | 104166134 A | 11/2014 |

(Continued)

OTHER PUBLICATIONS

"Location Based Beamforming in 5G Ultra-Dense Networks", P. Kela, et al, VTC 2016 Fall,total 7 pages.

*Primary Examiner* — Sam K Anh
*Assistant Examiner* — Amneet Singh
(74) *Attorney, Agent, or Firm* — Womble Bond Dickinson (US) LLP

(57) ABSTRACT

A network node for a wireless communication system is configured to localize a user node in a first localization operation carried out at a first frequency; determine an accuracy value associated with the first localization operation; and adjust at least one beam parameter for radio beams to be used in a second localization operation based on the determined accuracy value, the second localization operation carried out at a second frequency that is greater than the first frequency. The network node is configured to determine the accuracy value associated with the first localization operation by tracking a rate of change of an angle of a radio beacon signal transmitted from the user node relative to the network node.

16 Claims, 8 Drawing Sheets

(51) Int. Cl.
*H04W 64/00* (2009.01)
*G01S 5/00* (2006.01)

(52) U.S. Cl.
CPC ........ *H04B 7/0617* (2013.01); *H04W 64/006* (2013.01); *G01S 5/0036* (2013.01)

(56) References Cited

U.S. PATENT DOCUMENTS

| | | | |
|---|---|---|---|
| 2010/0165914 A1* | 7/2010 | Cho | H04B 7/0695 370/328 |
| 2014/0098912 A1 | 4/2014 | Yin et al. | |
| 2014/0148107 A1 | 5/2014 | Maltsev et al. | |
| 2016/0020876 A1 | 1/2016 | Raghavan et al. | |
| 2017/0104517 A1* | 4/2017 | Kakishima | H04B 7/0697 |

FOREIGN PATENT DOCUMENTS

| | | |
|---|---|---|
| CN | 106778981 A | 5/2017 |
| CN | 107064880 A | 8/2017 |
| WO | 9957574 A1 | 11/1999 |
| WO | 2017028875 A1 | 2/2017 |

\* cited by examiner

APPARATUS FOR CONFIGURING REFERENCE SIGNAL BEAMS BASED ON ACCURACY OF USER EQUIPMENT LOCALIZATION

CROSS-REFERENCE TO RELATED APPLICATIONS

This application is a continuation of International Application No. PCT/EP2017/056552, filed on Mar. 20, 2017, the disclosure of which is hereby incorporated by reference in its entirety.

TECHNICAL FIELD

The present disclosure relates generally to wireless communication systems and more particularly to localization of a user node by a network node in a wireless communication system.

BACKGROUND

In the context of next generation (5G) wireless networks, both low frequency radio and high frequency radio are considered to be used for the purpose of establishing access links between access nodes (also access points, base stations, or Node B or eNode B/eNB) and user nodes (also user devices, user equipment/UE, mobile terminals, or mobile device) within a wireless access network. Within 3GPP standardization for 5G, low frequency (LF) and high frequency (HF) are defined as the frequencies below and above 6 GHz, respectively. The high frequency band can be in the range of approximately to and including 30 GHz to 60 GHz, and low frequency band can be in the range of approximately to and including 3 GHz to 4 GHz.

The large available bandwidth and high gain narrow antenna beam make high frequency links very suitable to provide very high data throughput between access nodes and user nodes. However, it can be difficult to establish and maintain such links using narrow beams since users are typically moving and rotating their devices. Also, high frequency links are more subject to blockage due to building walls, vehicles and foliage in a varying environment than those of low frequency. It is important for the user equipment to maintain the best transmission beam direction for the transmitter, best reception beam direction for the receiver and best beam-pair for the transmitter and receiver when both are using narrow beams. The localization of the user node as well as the determination of the optimal antenna beam direction for both the access node and user node can benefit from the combined usage of high frequency and low frequency links.

In particular, low frequency links can have relatively wider antenna beam widths and can be used to provide coarse localization of the user node before the more accurate localization is done with the high frequency link. The low frequency link can also be used for control messages and signalling between the access node and the user node, and to help the localization and beam alignment on the high frequency link.

It would be advantageous to be able to configure the high frequency beams of a reference signal based on an accuracy of the user node localization on low frequency in order to achieve beam alignment in high frequency with an optimal resource usage. The quantity of beams will have impact on many system performance aspects including the network resource usage, the user node resource usage as well as the time used to finish user node localization on high frequency.

Accordingly, it would be desirable to be able to provide an apparatus and method that addresses at least some of the problems identified above.

SUMMARY

It is an object of the disclosed embodiments to configure the high frequency beams of a reference signal based on an accuracy of the user node localization on low frequency. This object is solved by the subject matter of the independent claims. Further advantageous modifications can be found in the dependent claims.

According one embodiment the above and further objects and advantages are obtained by a network node for a wireless communication system. The network node is configured to localize a user node in a first localization operation carried out at a first frequency; determine an accuracy value associated with the first localization operation and adjust at least one beam parameter for radio beams to be used in a second localization operation based on the determined accuracy value. The second localization operation is carried out at a second frequency that is greater than the first frequency. The network node is configured to determine the accuracy value during the first localization operation by tracking a rate of change of an angle of a radio beacon signal transmitted from the user node. If the rate of change of the angle exceeds a pre-determined value a first value is assigned to the accuracy value, the first value being lower than a previous accuracy value. If the rate of change is less than the pre-determined value a second value is assigned to the accuracy value, the second value being higher than a previous accuracy value. Since the parameters, including but not limited to the number of beams and/or the width of beams, will have impact on the network resource usage, the performance of localization at a second frequency and the interference within the network, controlling those parameters carefully and adaptively will have benefits for above-mentioned embodiments. For example, when a fewer number of beams are used for the localization at a second frequency, the used radio resource and caused interference will be less. The disclosed embodiments configure the high frequency beams of a reference signal based on the accuracy of the user node localization on low frequency in order to achieve beam alignment in high frequency with an optimal resource usage.

In a possible implementation form of the network node according to one embodiment, the network node is further configured to receive a movement measurement value from the user node, the movement measurement value being based on one or more of a change in location of the user node or a change in orientation of the user node. The movement measurement value is compared to a pre-determined movement measurement value and the determined accuracy value is adjusted based on the comparison. The configuration of beams used for the high frequency localization can be optimized based on the accuracy of the low frequency localization of the user node. The movement measurement value is used to assist the network node to determine the low frequency localization accuracy value, based on for example measurements done by the user node using internal sensors.

In a further possible implementation form of the network node according to one embodiment, the network node is configured to adjust the at least one beam parameter for radio beams to be used in the second localization by adjusting a number of radio beams and a beam width of the radio beams to be used for the second localization operation; and send the determined configuration of radio beams for the second localization operation to the user node. Optimizing the number of beams and the width of the beams improves resource usage in the second, high frequency localization, since more beams increases the energy used and adds more complexity and cost. The width of the beams impacts the interference and coverage of a network. A larger beam width and be used to increase the coverage of the network node.

In a further possible implementation form of the network node according to one embodiment, the network node is configured to localize the user node in the second localization operation by decreasing the number of radio beams for the second localization operation from a pre-determined number of radio beams when the determined accuracy value is greater than a pre-determined accuracy threshold value and increasing the number of radio beams in for the second localization operation from the pre-determined number of radio beams when the determined accuracy value is less than the pre-determined accuracy threshold value. By dynamically changing the beam configuration and beam parameters for the user equipment to measure on the downlink, based on accuracy of localization with low frequency links, resource usage of the localization process can be improved. If the network node has had an accurate localization on the first frequency, less beams are used for the second localization on the second frequency. The user node should measure and report less number of beams, which improves energy consumption and localization latency.

In a further possible implementation form of the network node according to one embodiment the network node is configured to decrease the beam width of the radio beams from a pre-determined beam width when the determined accuracy value is greater than the pre-determined accuracy threshold value and increase the beam width of the radio beams from the pre-determined beam width when the determined accuracy value is less than the pre-determined accuracy threshold value. By dynamically changing the beam configuration and beam parameters for the user equipment to measure on the downlink, based on accuracy of localization with low frequency links, resource usage of the localization process can be improved. By improving the localization on the second frequency, the beam width can be minimized, which will improve interference from other users.

In a further possible implementation form of the network node according to one embodiment, the network node is configured to adjust the number of beams independently of adjusting the beam width of the beam pattern of the radio beams in the set of radio beams.

In a further possible implementation form of the network node according to one embodiment the network node is configured to track the rate of change of the angle of the radio beacon signal transmitted from the user node relative to the network node by determining an angle of arrival of the radio beacon signal, comparing the determined angle to a previously determined angle of arrival; and determining the rate of change of the angle of the radio beacon signal based on the comparison. Tracking the angle of arrival of the radio beacon signal is used to assist the network node to determine the low frequency localization accuracy value, based on for example measurements done by the user node using internal sensors.

According to one embodiment, the above and further objects and advantages are obtained by a user node in a wireless communication system. The user node is configured to determine a movement measurement value of the user node, the movement measurement value being based on one or more of a change in location and a change in orientation of the user node; transmit the movement measurement value to the network node; receive information on a configuration of radio beams for be used for a second localization operation of the user node, the configuration of radio beams being based on the determined movement measurement value; and use the radio beams for either transmission or reception in the second localization operation of the user node. The beam configuration for the high frequency localization phase can be optimized with knowledge of the accuracy of the low frequency localization, which improves resource usage and system performance.

In a possible implementation form of the user node according to one embodiment the user node is configured to obtain measurement data for one or more of the change in location and orientation of the user node from internal sensors, compare the obtained measurement data to pre-determined thresholds, and determine the movement measurement value based on the comparison. With greater knowledge of the accuracy of the localization of the user node, the number of beams and the beam width of the beams can be optimized.

According to one embodiment, the above and further objects and advantages are obtained by a method. In one embodiment the method comprises localizing a user node in a first localization operation carried out at a first frequency; determining an accuracy value associated with the first localization operation; adjusting at least one beam parameter for radio beams to be used in a second localization operation based on the determined accuracy value, the second localization operation carried out at a second frequency that is greater than the first frequency; and determining the accuracy value associated with the first localization operation by: tracking a rate of change of an angle of a radio beacon signal transmitted from the user node relative to the network node; and if the rate of change of the angle exceeds a pre-determined value assigning a first value to the accuracy value, the first value being lower than a previous accuracy value and if the rate of change is less than the pre-determined value assigning a second value to the accuracy value, the second value being higher than a previous accuracy value. The disclosed embodiments configure the high frequency beams of a reference signal based on the accuracy of the user node localization on low frequency in order to achieve beam alignment in high frequency with an optimal resource usage.

In a possible implementation form of the method according to one embodiment, the method further includes receiving a movement measurement value from the user node, the movement measurement value being based on one or more of a change in location of the user node or a change in orientation of the user node; comparing the movement measurement value to a pre-determined movement measurement value; and adjusting the determined accuracy value based on the comparison. The configuration of beams used for the high frequency localization can be optimized based on the accuracy of the low frequency localization of the user node. The movement measurement value is used to assist the network node to determine the low frequency localization accuracy value, based on for example measurements done by the user node using internal sensors.

In a further possible implementation form of the method according to one embodiment, the method includes adjusting the at least one beam parameter for radio beams to be used in the second localization by adjusting a number of radio beams and a beam width of the radio beams to be used for the second localization operation; and sending the determined configuration of radio beams for the second localization operation to the user node. Optimizing the number of beams and the width of the beams improves resource usage in the second, high frequency localization, since more beams increases the energy used and adds more complexity and cost. The width of the beams impacts the interference and coverage of a network. A larger beam width and be used to increase the coverage of the network node.

In a further possible implementation form of the method according to one embodiment the method includes decreasing the number of radio beams for the second localization operation from a pre-determined number of radio beams when it is determined that the accuracy value is greater than a pre-determined accuracy threshold value and increasing the number of radio beams in for the second localization operation from the pre-determined number of radio beams when it is determined that the accuracy value is less than the pre-determined accuracy threshold value. By dynamically changing the beam configuration and beam parameters for the user equipment to measure on the downlink, based on accuracy of localization with low frequency links, resource usage of the localization process can be improved. If the network node has had an accurate localization on the first frequency, less beams are used for the second localization on the second frequency. The user node should measure and report less number of beams, which improves energy consumption and localization latency.

In a further possible implementation form of the method according to one embodiment the method includes decreasing the beam width of the radio beams from a pre-determined beam width when it is determined that the accuracy value is greater than the pre-determined accuracy threshold value and increasing the beam width of the radio beams from the pre-determined beam width when it is determined that the accuracy value is less than the pre-determined accuracy threshold value. By dynamically changing the beam configuration and beam parameters for the user equipment to measure on the downlink, based on accuracy of localization with low frequency links, resource usage of the localization process can be improved. By improving the localization on the second frequency, the beam width can be minimized, which will improve interference from other users.

In a further possible implementation form of the method according to one embodiment the method includes tracking the rate of change of the angle of the radio beacon signal transmitted from the user node relative to the network node by determining an angle of arrival of the radio beacon signal, comparing the determined angle to a previously determined angle of arrival; and determining the rate of change of the angle of the radio beacon signal based on the comparison. Tracking the angle of arrival of the radio beacon signal is used to assist the network node to determine the low frequency localization accuracy value, based on for example measurements done by the user node using internal sensors.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosure, for which reference should be made to the appended claims. Additional aspects and advantages of the disclosure will be set forth in the description that follows, and in part will be obvious from the description, or may be learned by practice of the embodiments described herein. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, various embodiments will be explained in more detail with reference to the example embodiments shown in the drawings, in which.

DETAILED DESCRIPTION

Figure 1:
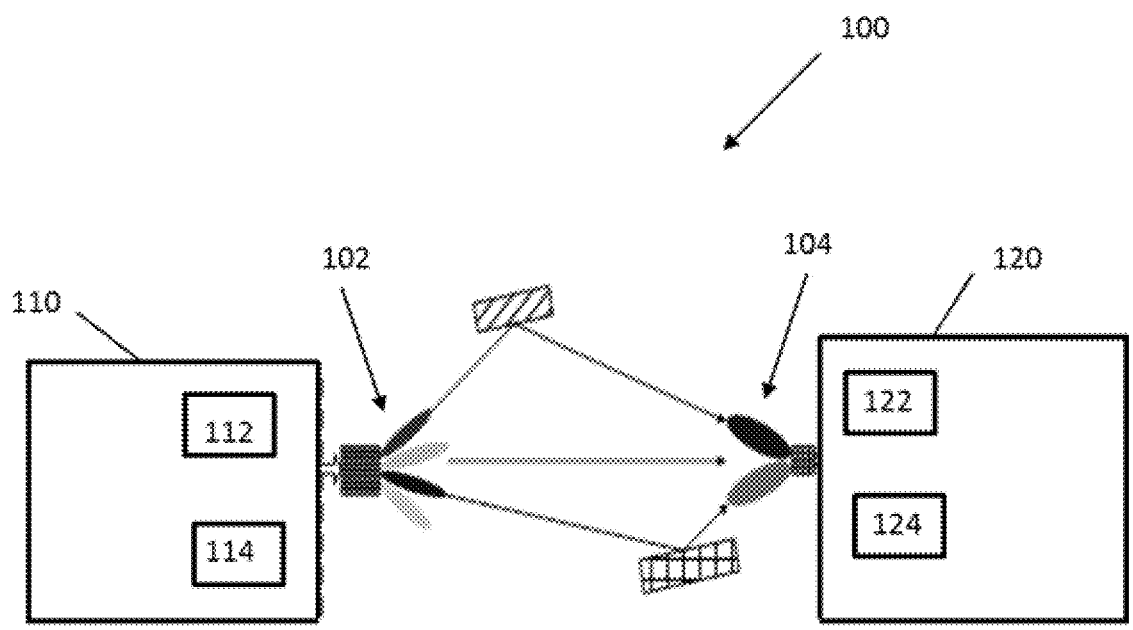
FIG. 1 is a block diagram illustrating an exemplary wireless communication system incorporating aspects of the disclosed embodiments.

Referring to FIG. 1 there can be seen an exemplary block diagram of a wireless communication system 100 incorporating aspects of the disclosed embodiments. The aspects of the disclosed embodiments are directed to configuring the high frequency beams of a reference signal based on a determined accuracy of the user equipment localization on low frequency. By dynamically changing the beam configuration and beam parameters for the user equipment to measure on the downlink or the network to measure on the uplink, based on accuracy of localization with low frequency links, resource usage of the localization process can be improved.

As is illustrated in FIG. 1, the wireless communication system 100 includes at least one network node 110 and at least one user node 120. In these examples, the wireless communication system 100 can be any suitable type of wireless communication system, such as for example, but not limited to LTE, 5G or new radio (NR). The network node 110 can generally comprise or include a network node such as an Evolved Universal Terrestrial Radio Access Network (E-UTRAN) NodeB or evolved NodeB (eNB). The network node 110 may also be referred to as an access point or base station. The user node 120 can generally comprise or include one or more of a user equipment (UE), a mobile terminal, mobile device or communication apparatus, for example.

The aspects of the disclosed embodiments generally include the determination of the low frequency (LF) localization accuracy of the user node 110, a determination of beam parameters for beams used for transmission and/or reception, and the transfer of such determination information through specific signalling. Based upon such low frequency localization accuracy, the number of high frequency (HF) beams and the beam width of such high frequency beams can also be adjusted. For example, the higher the accuracy of the low frequency localization, the narrower the high frequency beam width should be. The lower the accuracy of the low frequency localization, the wider the high frequency beam width should be. The adjustment of number of beams and the adjustment of beam width can be done independently, also can be done jointly.

In one embodiment, the network node 110 is configured to localize a user node 120 in a first localization operation. The first localization operation is carried out at a first frequency, such as a low frequency.

In one embodiment the network node 110 is configured to localize the user node 120 in the first localization with a low frequency link based on downlink measurement. In this example, the network node 110 transmits one or more reference signals to the user node 120. The user node 120 measures the one or more references signals and detects the strongest reference signal or signals. The user node 120 can transmit the results of the measurements, such as by transmitting an identifier associated with the strongest reference signal or signals, back to the network node 110. The network node 110 can select the radio beams based on the received measurement results for the second localization.

Where the first localization operation is based on an uplink measurement, the network node 110 receives reference signals or radio beacon signals that are transmitted by the user node 120. The network node 110 measures the received uplink reference signals or radio beacons to determine the radio beams to be used for the second localization.

The network node 110 is further configured to determine an accuracy value associated with the first localization. Based on the determined accuracy value, the network node 110 is configured to adjust at least one beam parameter for radio beams to be used in a second localization operation. In one embodiment, the second localization operation is carried out at a second frequency, where the second frequency is greater than the first frequency. Generally, the second frequency is in the high frequency range.

In one embodiment, the network node 110 is configured to determine the accuracy value associated with the first localization operation by tracking a rate of change of an angle of a radio beam signal transmitted from the user node 120 relative to the network node 110, also referred to as an uplink signal or radio beam. If the rate of change of the angle exceeds a pre-determined value, a first value can be assigned to the accuracy value, the first value being lower than a previous accuracy value. If the rate of change is less than the pre-determined value, a second value can be assigned to the accuracy value, the second value being higher than a previous accuracy value.

In the example of FIG. 1, the network node 110 is configured to include at least one processor or processing device 112 and at least one transceiver device 114. While the processor 112 and transceiver 114 are shown in FIG. 1 as being separate devices, in alternate embodiments, the processor 112 and transceiver device 114 can comprise a single device. The network node 110 can include any suitable number of processors 112 and transceivers 114, depending upon the particular application and implementation.

The network node 110 can also be configured to include one or more antennas or antenna arrays 102. The antennas or antenna arrays 102 will be generally configured to generate one or more beams, generally referred to herein as directional beams 104. For the purposes of the description herein, the terms "beam", "antenna pattern", and "antenna gain pattern" may be used interchangeably.

The antenna array 102 can include both low frequency antennas and high frequency antennas. For the purposes of the description herein, low frequency and high frequency are defined as the frequencies below and above 6 GHz, respectively. The high frequency band can be around 30 GHz or 60 GHz, or in the range there between, and the low frequency band can be around 3 GHz or 4 GHz, or the range there between, for example.

There are two special aspects of high frequency radio from the perspective of its antenna design. One is that a high frequency antenna captures less signal energy and secondly more noise power than a low frequency antenna. The former is due to higher frequency and smaller antenna aperture, and the latter is due to normally wider high frequency radio channel bandwidth. Hence high frequency radio suffers from lower signal-to-noise ratio, which, however, can be compensated by higher antenna gains with higher antenna directionality. Due to its smaller wavelength, the antenna size is typically smaller for high frequency radio than in low frequency applications. The transmitter and receiver of high frequency radio can accommodate more antenna elements, and hence narrower beams can be produced with large number of antenna elements which will yield higher antenna gains. The beam can be formed through a phase control system such that the direction, as well as the beam width can be adjusted. Narrower beams are beneficial for the purpose of providing higher antenna gains, causing less multi-path fading as well as minimizing cross link interference.

The user node 120 will generally be configured to include at least one transceiver 122 and at least one processor or processing device 124. Although the transceiver 122 and processor 124 are shown in the example of FIG. 1 as separate devices, in alternate embodiments, the transceiver 122 and processor 124 can comprise a single device or unit. The user node 120 can be configured to include any suitable number of transceivers 124 and processors 122, depending upon the particular application and implementation.

In one embodiment, the user node 120 can be configured to also include one or more antennas or antenna arrays 104. The antennas 104 are configured to generate one or more receiving beam patterns, to receive, among other things, the signals transmitted from the network node 110.

Figure 2:
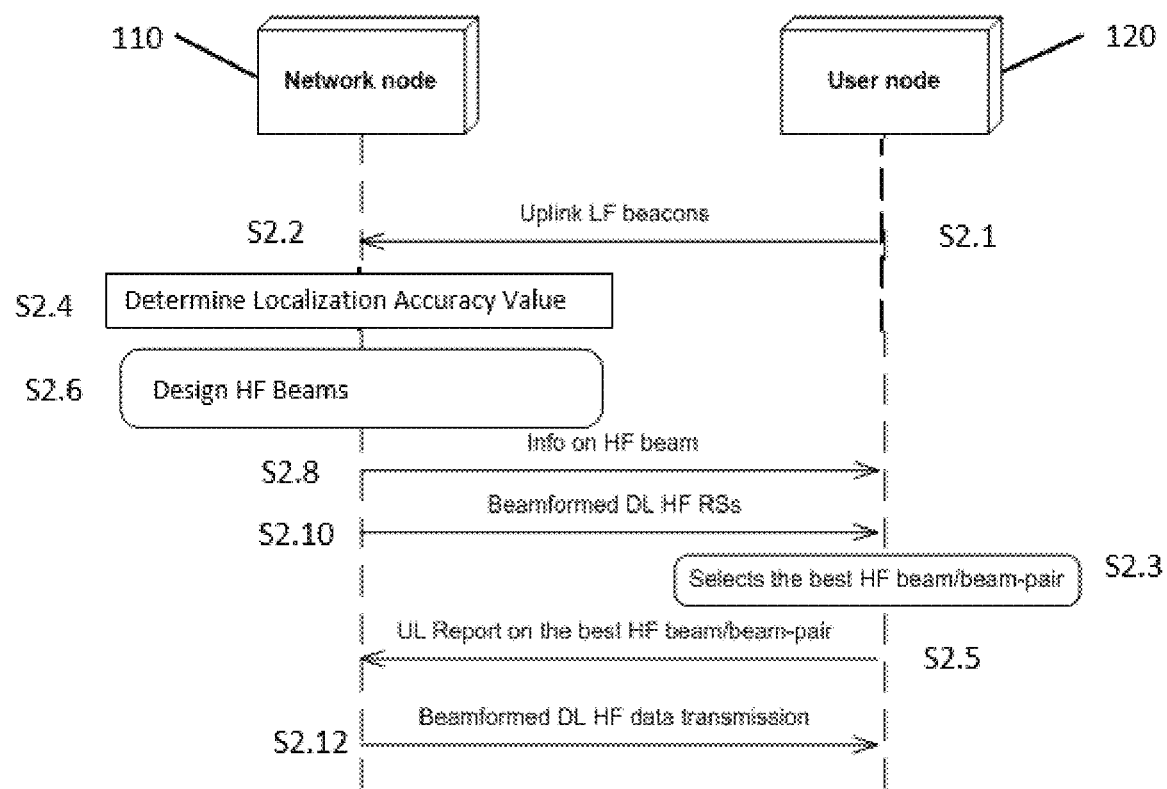
FIG. 2 is a flow diagram illustrating an exemplary process incorporating aspects of the disclosed embodiments.

Referring to FIG. 2, in one embodiment, the user node 120 is configured to transmit S2.1, and the network node 110 is configured to receive S2.2, uplink low frequency radio beacons, also referred to as UL reference signals. The user node 120 transmits S2.1 the UL reference signals, and the network node 110 is configured to measure the UL reference signals. In one embodiment, the network node 110 is configured to allocate uplink radio resources of low frequency and the user node 120 transmits S2.1 the radio beacons using the allocated radio resources. After the beacons are received S2.2 by the network node 110, the location of the user node 120 can be determined for example using localization algorithms and positioning models. The localization results from low frequency are then used to assist the high frequency localization before data is transmitted with the high frequency link when there is a strong enough high frequency path available between the network node 110 and the user node 120.

Typically, high frequency links are expected to work under Line-of-Sight (LoS) conditions. The classification of LoS condition/Non-LoS conditions can be done reasonably well with low frequency (e.g. sub-6 GHz) link estimation. One way of doing this is by estimating the Rice factor of the channel. It can also be assumed there is a non-negligible correlation between the Rice-factors of the channels in low frequency (sub-6 GHz) and high frequency.

As the low frequency link can work in non-line of sight (NLOS), and the shadowing effects are much less severe than in the high frequency band, it is assumed that the user node 120 can always be reached and localized via low frequency. In one embodiment, the localization accuracy can depend on, but is not limited to, the positioning models that are used in the localization algorithm, the actual frequency of low frequency and the density of the access nodes involved in the measurement.

In one embodiment, the network node 110 is configured to determine S2.4 an accuracy value associated with the first localization. The accuracy of the low frequency localization is influenced by many factors including system frequency, network deployment, operation environment, user node movement, and so on. The system frequency and network deployment can be the same for all or a majority number of user nodes 120. The determination of the accuracy or accuracy value and the transfer of the determined accuracy information can be conveyed through static "system information" which is carried on e.g., a broadcast channel. The operation environment and movement of the user node 120 can be specific for an individual user node 120 or a group of user nodes 120. In one embodiment, the determination on the accuracy value and the transfer of the determined accuracy information can be conveyed through "dedicated" channels, such as e.g. dedicated control channel.

The accuracy of the first localization generally refers to the precision of the localization. Based on the localization method used by the system 100, as well as the obtained measurement which the localization methods are based upon, any localization result can be associated with an accuracy value. An accuracy value that is deemed to be high generally implies a degree of confidence in the localization result, while a lower relative accuracy value implies less confidence in the localization result.

Based on the accuracy of the first localization with the low frequency link, the beam configuration for the high frequency localization can be adapted to improve the resource usage. For example, if the low frequency localization is associated with a high accuracy, fewer high frequency beams may be used in the high frequency localization. On the other hand, if the low frequency localization is associated with a lower accuracy, a greater number of high frequency beams may be used. Generally, the higher or greater the accuracy, the fewer number of high frequency beams used.

Figure 3:
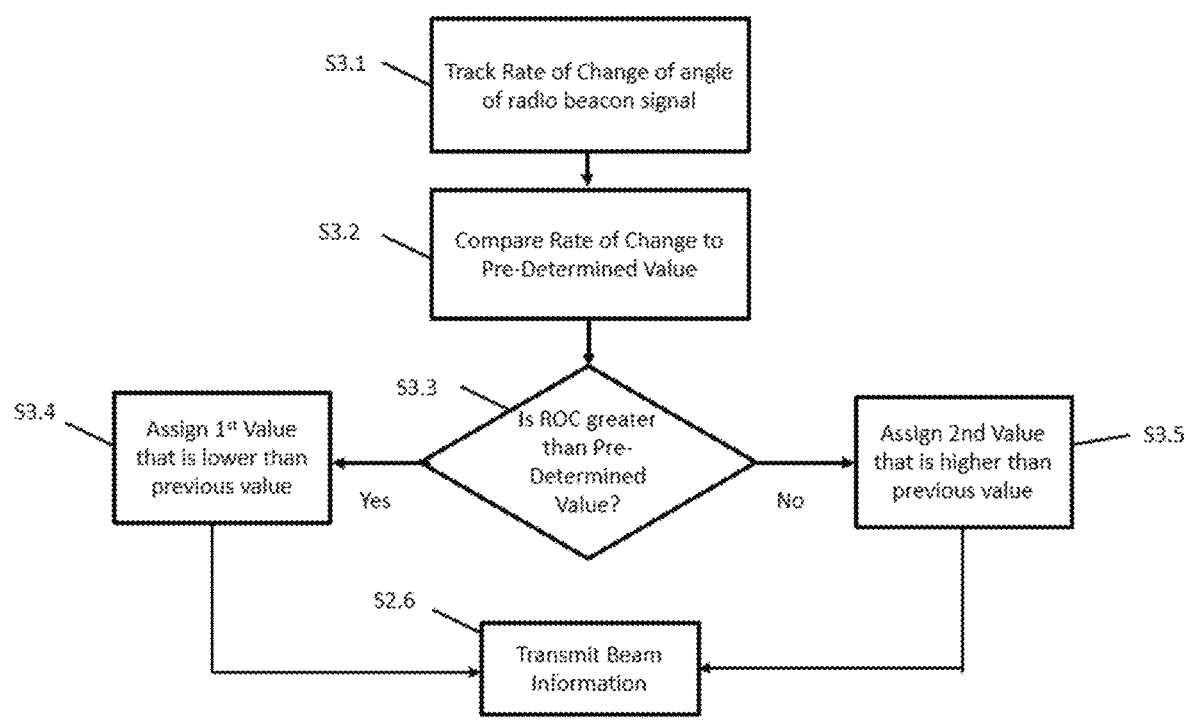
FIG. 3 is a flow diagram illustrating an exemplary process incorporating aspects of the disclosed embodiments

FIG. 3 illustrates one example of determining S2.4 an accuracy value associated with the first, low frequency localization according to the aspects of the disclosed embodiments. In this example, the accuracy value is determined by tracking S3.1 a rate of change of an angle of uplink signal, or radio beacon, transmitted by the user node 120 relative to the network node 110. In one embodiment, the network node 110 determines the angle of the arrival of the signal from the user node 120, and also determines how fast the angle of the arrival of the signal is changing. In one embodiment, the network node 110 is configured to compare the determined angle of arrival to a previous angle of arrival. The change of the angle as well as the rate of change of the angle over time can be determined based on the comparison. The change of angle of arrival of the signal from the user node 120 is normally caused by the movement and rotation of the user node 120.

The determined rate of change of the angle of the uplink signal is compared S3.2 to a pre-determined value. The pre-determined value is a reference design parameter. It can be set with an initial value and iteratively tuned in a test or trial procedure.

It is determined S3.3 whether the determined rate of change of the angle is greater than the pre-determined rate of change value. If the determined rate of change of the angle is greater than the pre-determined value, a first value is assigned S3.4 to the accuracy value. This first value will have a value that is lower than a previous value of the accuracy. If the determined rate of change of the angle is less than the pre-determined value, a second value is assigned S3.5 to the accuracy value. The second value will have a value that is higher than the previous value of the accuracy.

A rate of change that is higher than the pre-determined value generally indicates that the precision or accuracy of the first localization is low, or less precise. The low accuracy value will indicate to the network node 110 that a greater number of beams should be used during the high frequency localization.

A rate of change that is lower than the pre-determined value generally indicates that the precision or accuracy of the first low frequency localization is high, or more precise. The higher accuracy value will indicate to the network node 110 that a lesser number of beams should be used during the high frequency localization.

The process of tracking S3.1 the angle of the radio beacon and determining S3.3 if the rate of change is greater than a pre-determined value can be an iterative process. In one embodiment, the network node 110 is configured to update the accuracy value each time a new rate of change of the angle of the radio beacon signal is received.

In one embodiment, the beam width of the beams used during the second, or high frequency localization, can be adjusted based on the determined accuracy value. When the accuracy value is determined S3.4 to be lower than the pre-determined value, the beam width of the high frequency beams can be adjusted to be wider than a pre-determined beam width. Wider beams will help to improve the accuracy of the second localization.

When the accuracy value is determined S3.5 is determined to be higher than the pre-determined value, meaning that the accuracy of the first localization is high, or more precise, the beam width of the beams used during the second localization can be narrowed. The ability to reduce the number of beams and utilize narrower beam widths can provide savings in terms of the resources used during the second localization.

Figure 4:
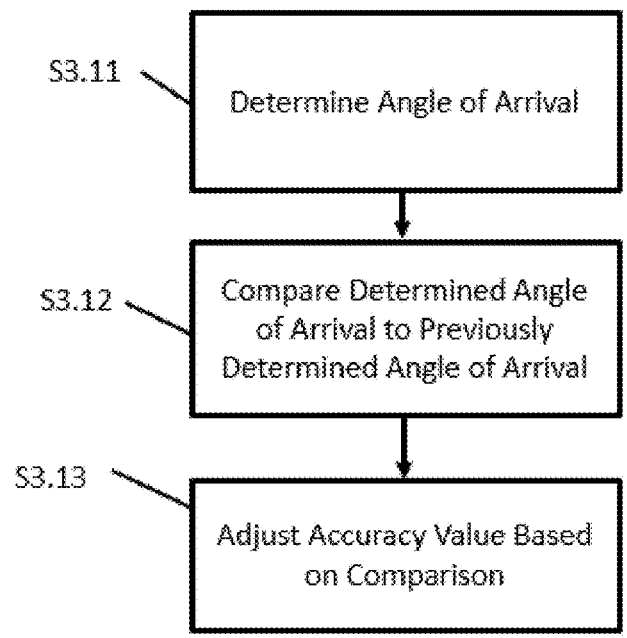
FIG. 4 is a flow diagram illustrating an exemplary process incorporating aspects of the disclosed embodiments.

FIG. 4 illustrates a method of tracking S3.1 the rate of change of the angle. In this example, the angle of arrival of the radio beacon signal relative to the network node 110 is determined S3.11. The determined angle is compared S3.12 to a previously determined angle of arrival. The accuracy value is adjusted S3.13 based on the comparison.

Referring again to FIG. 2, once the accuracy value is determined, the beam parameters are determined S2.6 and the beam parameter or information can be transmitted S2.8 to the user node 120. The beam information that is determined and transmitted can include one or more of the number of beams that should be used for the second, high frequency localization as well as the beam width for the beams in the second localization.

Figure 5:
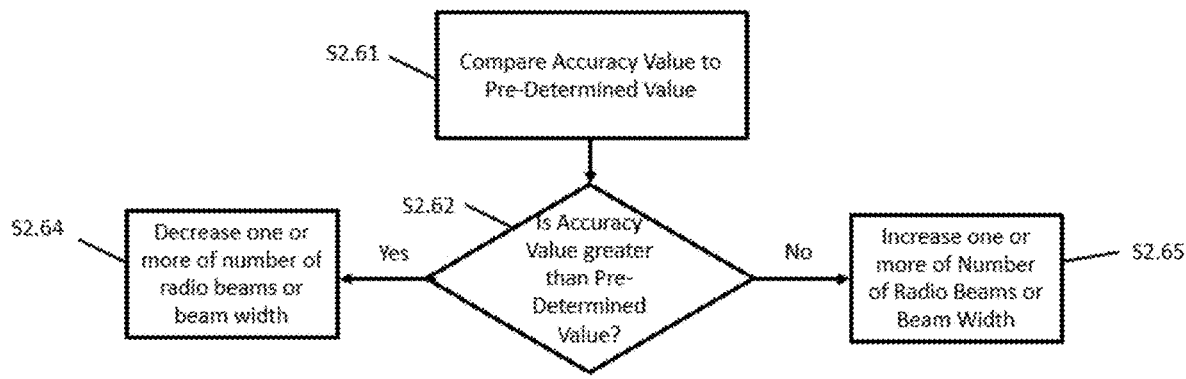
FIG. 5 is a flow diagram illustrating an exemplary process incorporating aspects of the disclosed embodiments.

For example, referring to FIG. 5 one method for adjusting the beam parameters based on the accuracy of the first localization is illustrated. In this example, the determined accuracy value is compared S2.61 to a pre-determined value. It is determined S2.62 whether the accuracy value is greater than the pre-determined value. If the accuracy value is greater than the pre-determined value, the number of high frequency beams for the second, or high frequency localization, can be decreased from a predetermined value. Alternatively, or in addition to decreasing the number of high frequency beams, a beam width of the high frequency beams can be reduced.

If it is determined S2.62 that the accuracy value is less than the pre-determined value, the number of high frequency beams for the second, or high frequency localization, can be increased from a predetermined value. Alternatively, or in addition to increasing the number of high frequency beams, a beam width of the high frequency beams can be increased.

The number of transmission beams that are used for one user node 120 is a design/operation parameter that can have impact on system performance. The number of beam used will impact the radio resource usage since the beams might be shared among multiple user nodes 120 as the total number of beams is restricted by hardware capabilities of the network node 110 and the user node 120. The number of beams used can also impact the power consumption for both the network node 110 and the user node 120 as more beams will result in higher power consumption. Processing time in the network node 110 can also be impacted, since with more beams a longer time should be used to process the estimation of the beams, or processing will have a higher complexity.

Thus it is beneficial to use a proper number of beams in the high frequency localization phase and this number can be optimized with the knowledge on the localization accuracy with low frequency link. Generally, the more accurate the first localization of the user node 120 is, the number of beams used in the high frequency localization is reduced.

Referring again to FIG. 2, in one embodiment, once the information on the beams for the second localization is sent S2.8 to the user node 120, the network node 110 can transmit S2.10 the beamformed, downlink high frequency radio signals. The user node 120 is configured to select S2.3 the best high frequency beam or beam pair. The user node 120 can send S2.5 a report on the best high frequency beam/beam pair. The network node 110 can then provide S2.12 beamformed downlink high frequency data transmission using the best high frequency beam/beam pair.

In one embodiment, the accuracy value of the first localization process can be further be assisted and determined using movement properties of the user node 120. The user node 120 specific properties can include but are not limited to, the mobility of the user node 120 and internal sensor measurements pertaining to acceleration and orientation, for example. In this example, the quantity of high frequency beams can be determined on a user node specific basis and the related signalling is transmitted to user node 120 with a user node specific channel.

Figure 6:
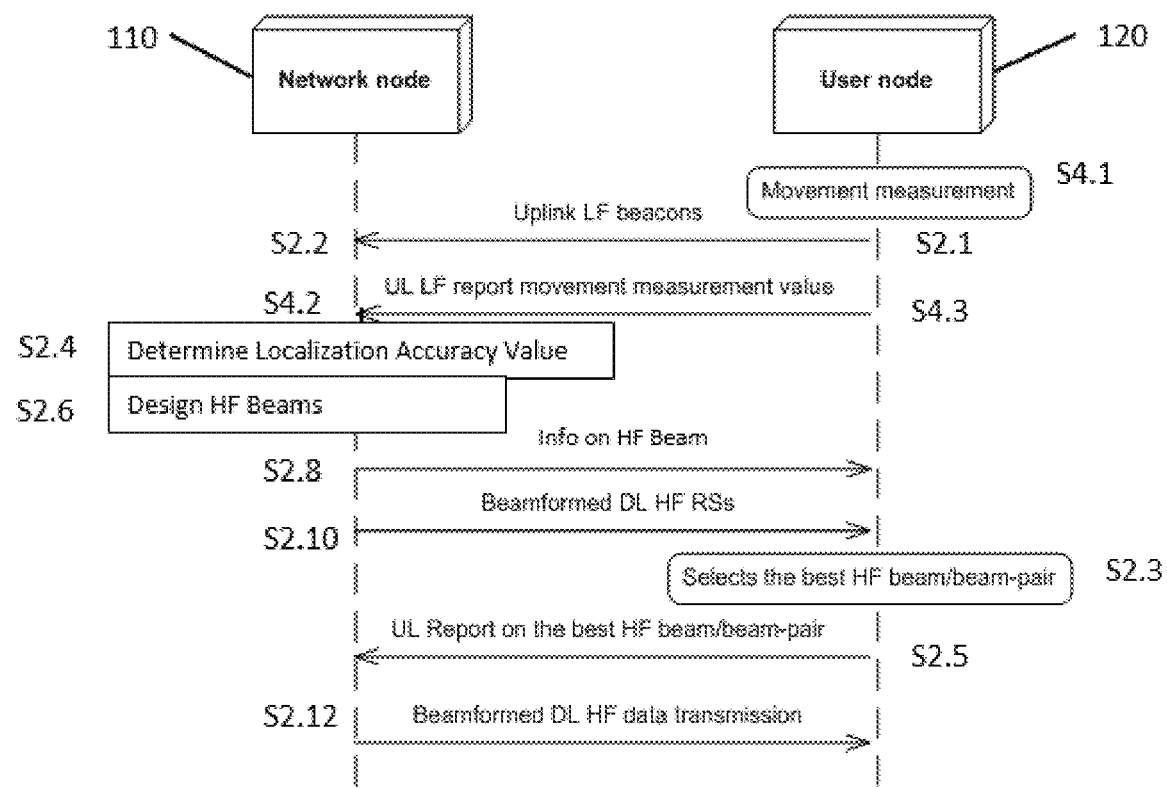
FIG. 6 is a flow diagram illustrating an exemplary process incorporating aspects of the disclosed embodiments.

FIG. 6 illustrates a process where movement properties of the user node 120 are used in conjunction with the tracking of the rate of change of the angle of the uplink beacon to determine of the accuracy value. In this example, the user node 120 is configured to determine S4.1 a movement measurement value of the user node 120. The determined movement measurement value is transmitted S4.3 to the network node 110, where it is received S4.2 and used in determining S2.4 the first localization accuracy value.

In one embodiment, the user node 120 is configured to determine S4.1 the movement measurement value from measurement and sensor data that is obtained by the user node 120. The movement measurement value can be based on one or more of a change in location and a change in orientation of the user node 120. The movement and measurement data can be generated by one or more sensors associated with the user node 110. For example, the referenced sensors can include, but are not limited to, sensors that measure or detect one or more of a movement, acceleration and orientation parameters of the user node 110. Particular examples include, but are not limited to, gyroscope sensors and accelerator sensors and can be part of the user node 120. The user node 120 can be configured to process the raw data received from the sensors to determine the movement measurement value.

For example, in one embodiment, the user node 120 is configured to process the sensor data using filtering, such as by comparing the sensor data against pre-determined threshold values for one or more of movement, acceleration and orientation. The movement measurement value determined by the network node 120 can be a simple Boolean indication value, such as a "high" or a "low" indicator. The movement measurement value can be transmitted S4.3 together with an uplink beacon or via independent uplink signalling. The movement measurement value is received S4.2 by the network node 110, and can be utilized by the network node 110 in determining S2.4 the localization accuracy value and the second localization beam related parameter settings.

Figure 7:
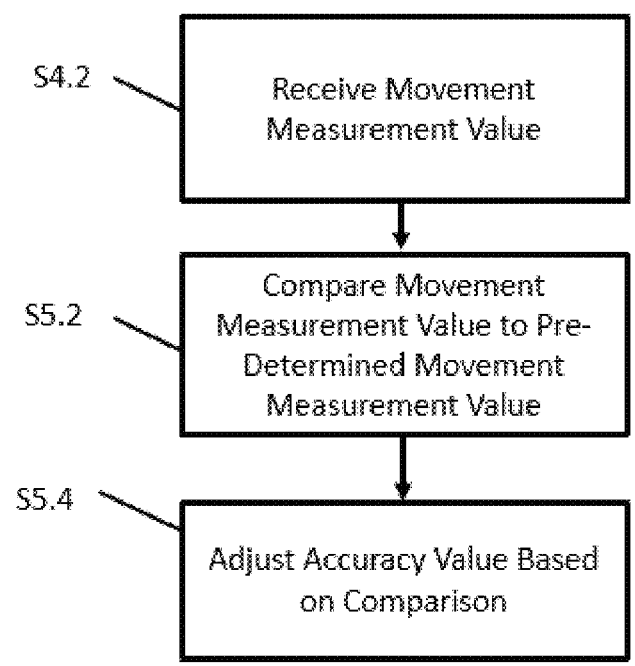
FIG. 7 is a flow diagram illustrating an exemplary process incorporating aspects of the disclosed embodiments.

For example, referring to FIG. 7, the movement measurement value is received by the network node 110. The movement measurement value is compared S5.2 to a pre-determined movement measurement value. The pre-determined movement measurement value can be a system design parameter or a comparison with a prior movement measurement value. The accuracy value can be adjusted S5.4 based on the comparison.

In one embodiment, the movement measurement value provided by the user node 120 can be used complementarily with the accuracy value which is determined by the network node 110 based on the change of angle of arrival signal from the user node 120. For example, when both are available, in one embodiment the network node 110 can be configured to apply either "AND" logic or "OR" logic to the values. Whether to use "AND" logic or "OR" logic can be a design parameter of the system 100. For example, in one embodiment, the use of "OR" logic with respect to the movement measurement value and the accuracy value can be a default configuration.

When the accuracy value associated with the first, low frequency localization is determined based on non-user node specific properties including system frequency, deployment density and used localization algorithm, the quantity of high frequency beams can be determined on a non-user node specific basis. In this example, the related signalling can be transmitted to user node 120 using a non-user node specific channel such as the broadcast channel.

In the case of uplink based measurement as described with respect to FIGS. 2 and 6, the user node 120 is configured to transmit uplink beacons with wide or narrow beams. The network node 110 and the user node 120 receive with narrow uplink reception beams and determine the best reception beam or best UL transmission-reception beam pair (or beam pairs).

The network node 110 is generally configured with the capability of transmitting and receiving with narrow beams. This capability can be optional for the user node 120. For either uplink based measurement or downlink based measurement, there is generally a need for one transmitter transmitting with multiple narrow beams and one receiver testing these multiple narrow beams with one or multiple reception beam(s).

Figure 8:
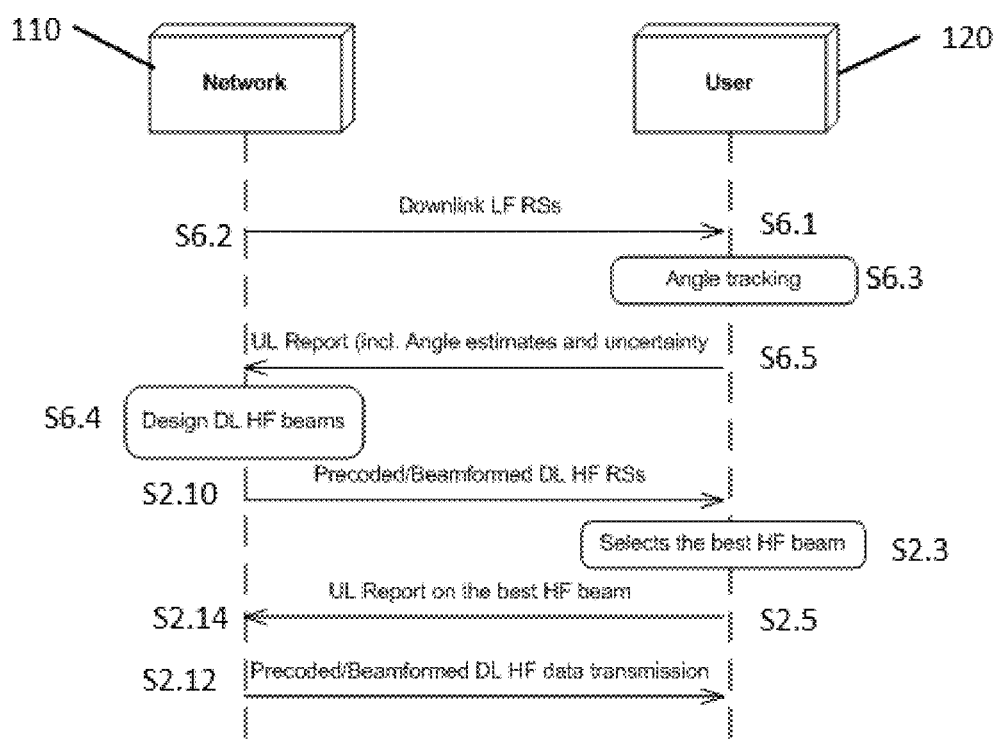
FIG. 8 is a flow diagram illustrating an exemplary down link reference signal based localization process incorporating aspects of the disclosed embodiments.

FIG. 8 illustrates one example of a downlink based measurement process incorporating aspects of the disclosed embodiments. In a downlink based measurement process, the network node 110 can be configured to transmit S6.2 low frequency downlink signals. The low frequency downlink signals, when received S6.1 by the user node 120, allow the user node 120 to track S6.3 the angles of the low frequency downlink signals relative to the network node 110. In this example, the user node 120 reports S6.5 the tracked angles as well as the corresponding accuracy in an uplink control/shared channel to the network node 110. The accuracy can be determined by the user node 120 with the help of the internal sensor(s) of the user node 120. The uplink control channel or uplink shared channel in this example can be a low frequency channel or a high frequency channel. The network node 110 is configured to use the accuracy value in the uplink control information in order to design S6.4 high frequency downlink beams around the tracked angles with the determined number of high frequency downlink beams, taking into account the tracking accuracy.

In this embodiment, the accuracy value is determined and reported to the network node 110 by the user node 120. The user node 120 is configured to determine the accuracy value based on the change rate of the angle of the downlink reference signals, and/or based on the movement measurement value provided by, for example, sensors internal to the user node 120. In one embodiment, the user node 120 is configured to apply either "AND" logic or "OR" logic to the values for such determination, similar to the determination by the network node 120 described herein.

The high frequency localization, in the case of downlink based measurement, can be done by the network node 110 transmitting with multiple narrow beam reference signals (narrow transmission antenna patterns) and the user node 120 measuring with a wide antenna reception pattern. As is illustrated in FIG. 8, in this example, the user node 120 is configured to select S2.3 a best transmission beam (or beams) and report S2.5 the results, which are received S2.14 at the user node 110. In one embodiment, the user node 120 is configured to measure with multiple reception antenna beams and determine/report a best transmission reception beam pair (or beam pairs). The network node 110 can then transmit S2.12 data to the user node 120.

Current communication networks often comprise multiple nodes of different types. The terminology "node" as used herein includes but is not limited to a user terminal device, a base station, a relay station, or any other type of device capable of operating in a wireless or wire-line environment. Within one communication network, the information is transferred from an information source node to an information reception node. Very often the transferring is achieved wirelessly through one or multiple radio links. The radio links have different properties due to the different frequency bands used.

Within the scope of the present disclosure low frequency and high frequency have different spectral bands. In particular, low frequency is lower than 6 GHz and high frequency is higher than 6 GHz, for example. The cutting frequency can be value such as 10 GHz. It is also noted that low frequency signals and high frequency signals will have different antenna patterns. For example, a low frequency signal can have a wide beam pattern from approximately 60 to and including 120 degrees, and even omni-directional antenna patterns. High frequency uses narrow beam patterns with a typical Half Power Beam Width (HPBW) ranging from 1 to 10 degrees. In accordance with the aspects of the disclosed embodiments, both the network node 110 and the user node 120 are configured to work in low frequency and high frequency. In at least one embodiment, the network node 110 and the user node 120 are using low frequency and high frequency simultaneously With low frequency, radio links with large coverage and reliable connection are easier to establish between the transmitter and the receiver due to the lower path loss than that of high frequency. In particular, high frequency links are easily blocked by building walls, vehicles and foliage, and such links are usually used in line-of-sight (LoS) scenarios. The interworking of the low frequency link and the high frequency link for the purpose of tracking user nodes 120 as is generally described herein is based on the fact that localization on low frequency links can provide coarse location information to high frequency links such that the resource and time spent on tracking user nodes 120 with high frequency links can be minimized.

Figure 9:
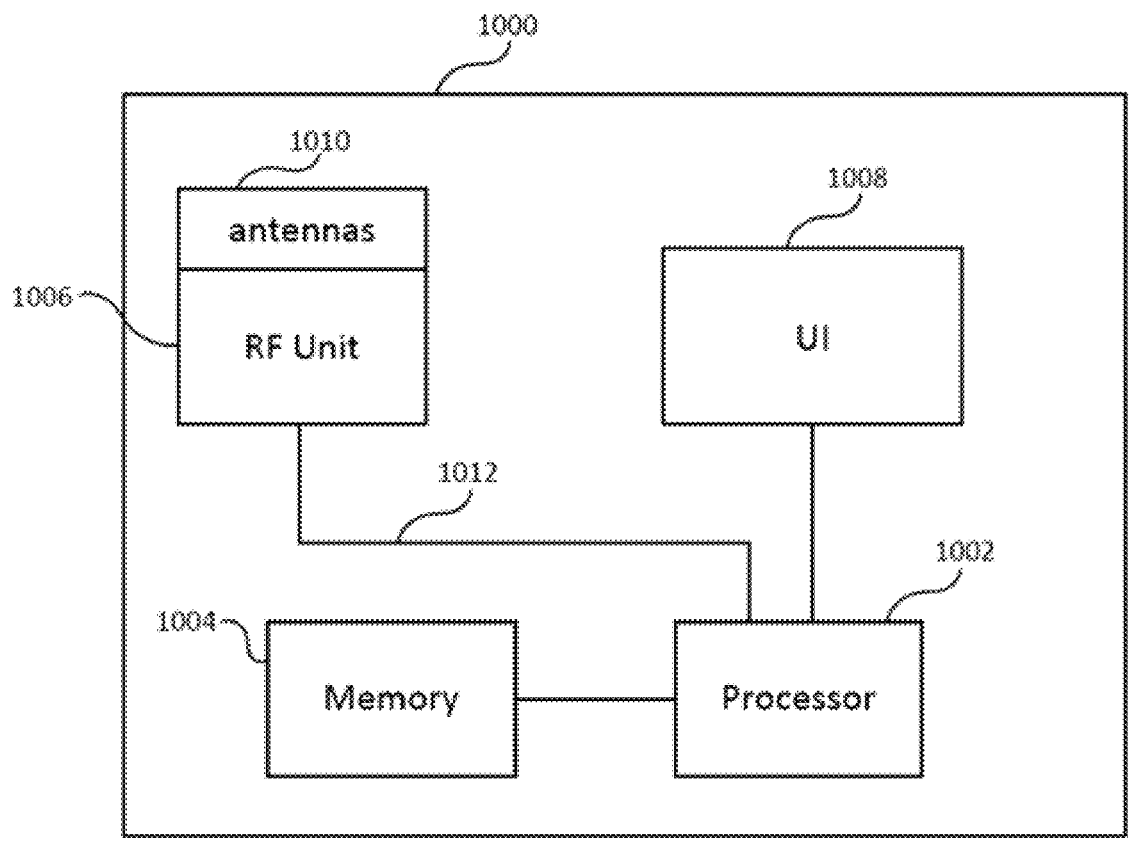
FIG. 9 is a schematic block diagram of an exemplary architecture that can be used to practice aspects of the disclosed embodiments.

FIG. 9 illustrates a block diagram of an exemplary apparatus 1000 appropriate for implementing aspects of the disclosed embodiments. The apparatus 1000 is appropriate for use in a wireless network and can be implemented in one or more of the network node 110 or the user node 120.

The apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the apparatus 1000. When the UI 1008 is removed the apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112 and 124 described with respect to FIG. 1, may be configured to implement any one or more of the methods described herein.

In the example of FIG. 9, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The apparatus 1000 can also include or be coupled to an RF Unit 1006 such as a transceiver, coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming. The antenna unit 1010 of FIG. 6 can be implemented as one or more of the antenna unit 102 or the antenna unit 104 shown in FIG. 1.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

The aspects of the disclosed embodiments configure the beam parameters of the high frequency beams based on the accuracy of the user node localization with a low frequency link. This can improve the high frequency resource usage in the process. By employing low frequency reference signals high frequency precoded/beamformed data transmission can be made more efficiently since the number of downlink high frequency beams that the user node should measure is smaller, thus reducing the user nodes power consumption and uplink signaling load.

Normally the higher accuracy with the low frequency localization, the less number of high frequency beams will be used either for the transmission or for the reception. The accuracy of low frequency localization is determined by the network and the user node based on information including system frequency and d deployment density. The positioning models that are used in the localization algorithm and can be updated with high frequency localization results.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the present disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

The invention claimed is:

1. A network node, comprising:
a memory; and
a processor coupled to the memory that stores instructions, which, when executed by the processor, cause the processor to:
localize a user node in a first localization operation carried out at a first frequency;
determine an accuracy value associated with the first localization operation;
adjust at least one beam parameter for radio beams to be used in a second localization operation based on the determined accuracy value, the second localization operation carried out at a second frequency that is greater than the first frequency;
wherein to determine the accuracy value associated with the first localization operation, the instructions further cause the processor to:
track a rate of change of an angle of a radio beacon signal transmitted from the user node relative to the network node,
if the rate of change of the angle exceeds a pre-determined value, assign a first value to the accuracy value, the first value being lower than a previous accuracy value; and
if the rate of change is less than the pre-determined value, assign a second value to the accuracy value, the second value being higher than a previous accuracy value.

2. The network node of claim 1, wherein the instructions further cause the processor to:
receive a movement measurement value from the user node, the movement measurement value being based on one or more of a change in location of the user node or a change in orientation of the user node;
compare the movement measurement value to a pre-determined movement measurement value; and
adjust the determined accuracy value based on the comparison.

3. The network node of claim 1 wherein the instructions further cause the processor to:
adjust the at least one beam parameter for radio beams to be used in the second localization by adjusting a number of radio beams and a beam width of the radio beams to be used for the second localization operation; and
send a configuration of radio beams for the second localization operation to the user node.

4. The network node of claim 3, wherein the instructions further cause the processor to localize the user node in the second localization operation by decreasing the number of radio beams for the second localization operation from a pre-determined number of radio beams when the determined accuracy value is greater than a pre-determined accuracy threshold value and increasing the number of radio beams in for the second localization operation from the pre-determined number of radio beams when the determined accuracy value is less than the pre-determined accuracy threshold value.

5. The network node of claim 4, wherein the instructions further cause the processor to decrease the beam width of the radio beams from a pre-determined beam width when the determined accuracy value is greater than the pre-determined accuracy threshold value and increase the beam width of the radio beams from the pre-determined beam width when the determined accuracy value is less than the pre-determined accuracy threshold value.

6. The network node of claim 5, wherein the instructions further cause the processor to adjust the number of beams independently of adjusting the beam width of a beam pattern of the radio beams in the radio beams.

7. The network node of claim 6, wherein to track the rate of change of the angle of the radio beacon signal transmitted from the user node relative to the network node the instructions further cause processor to:
   determine an angle of arrival of the radio beacon signal;
   compare the determined angle to a previously determined angle of arrival; and
   determine the rate of change of the angle of the radio beacon signal based on the comparison.

8. A user node, comprising:
   a memory; and
   a processor coupled to the memory, the memory storing instructions, which, when executed by the processor, cause the processor to:
      determine a movement measurement value of the user node, the movement measurement value being based on one or more of a change in location and a change in orientation of the user node;
      transmit the movement measurement value to a network node;
      receive, from the network node, information on a configuration of radio beams to be used for a second localization operation of the user node, the configuration of the radio beams being based on the determined movement measurement value and an accuracy value associated with a first localization operation of the user node, the accuracy value being determined by the network node based on a comparison between a pre-determined value and a rate of change of an angle, the angle being an angle of a radio beacon signal transmitted from the user node in the first localization operation relative to the network node; and
      use the radio beams for either transmission or reception in the second localization operation of the user node.

9. The user node of claim 8, wherein the instructions further cause the processor to
   obtain measurement data for one or more of the change in location and orientation of the user node from internal sensors;
   compare the obtained measurement data to pre-determined thresholds; and
   determine the movement measurement value based on the comparison.

10. A method comprising:
    localizing, by a network node, a user node in a first localization operation carried out at a first frequency;
    determining, by the network node, an accuracy value associated with the first localization operation;
    adjusting, by the network node, at least one beam parameter for radio beams to be used in a second localization operation based on the determined accuracy value, the second localization operation carried out at a second frequency that is greater than the first frequency; and
    determining, by the network node, the accuracy value associated with the first localization operation, including
       tracking a rate of change of an angle of a radio beacon signal transmitted from the user node relative to the network node;
       if the rate of change of the angle exceeds a pre-determined value, assigning a first value to the accuracy value, the first value being lower than a previous accuracy value; and
       if the rate of change is less than the pre-determined value, assigning a second value to the accuracy value, the second value being higher than a previous accuracy value.

11. The method of claim 10, further comprising:
    receiving, by the network node, a movement measurement value from the user node, the movement measurement value being based on one or more of a change in location of the user node or a change in orientation of the user node;
    comparing, by the network node, the movement measurement value to a pre-determined movement measurement value; and
    adjusting, by the network node, the determined accuracy value based on the comparison.

12. The method of claim 11, further comprising:
    adjusting, by the network node, the at least one beam parameter for radio beams to be used in the second localization by adjusting a number of radio beams and a beam width of the radio beams to be used for the second localization operation; and
    sending, by the network node, a configuration of radio beams for the second localization operation to the user node.

13. The method of claim 12, further comprising:
    decreasing, by the network node, the number of radio beams for the second localization operation from a pre-determined number of radio beams when the accuracy value is greater than a pre-determined accuracy threshold value; and
    increasing the number of radio beams for the second localization operation from the pre-determined number of radio beams when the accuracy value is less than the pre-determined accuracy threshold value.

14. The method of claim 13, further comprising:
    decreasing the beam width of the radio beams from a pre-determined beam width when the accuracy value is greater than the pre-determined accuracy threshold value, and
    increasing the beam width of the radio beams from the pre-determined beam width when the accuracy value is less than the pre-determined accuracy threshold value.

15. The method of claim 14, wherein the adjusting the number of beams is performed independently of adjusting the beam width of a beam pattern of the radio beams in the radio beams.

16. The method of claim 14, wherein tracking the rate of change of the angle of the radio beacon signal transmitted from the user node relative to the network node comprises:
    determining, by the network node, an angle of arrival of the radio beacon signal, comparing the determined angle to a previously determined angle of arrival, and determining the rate of change of the angle of the radio beacon signal based on the comparison.

* * * * *